(12) United States Patent
Conlon

(10) Patent No.: US 8,773,707 B2
(45) Date of Patent: Jul. 8, 2014

(54) SYSTEMS AND METHODS FOR IMPLEMENTING DYNAMIC USER INTENT-BASED FINISHER OPTIONS IN IMAGE FORMING AND DOCUMENT HANDLING SYSTEMS

(75) Inventor: Paul Roberts Conlon, South Bristol, NY (US)

(73) Assignee: Xerox Corporation, Norwalk, CT (US)

( * ) Notice: Subject to any disclaimer, the term of this patent is extended or adjusted under 35 U.S.C. 154(b) by 194 days.

(21) Appl. No.: 13/440,407

(22) Filed: Apr. 5, 2012

(65) Prior Publication Data

US 2013/0265591 A1 Oct. 10, 2013

(51) Int. Cl.
*G06K 15/02* (2006.01)

(52) U.S. Cl.
USPC ............................ 358/1.16; 358/1.1; 358/1.12

(58) Field of Classification Search
USPC .......... 358/1.1, 1.6, 1.9, 3.24, 1.12, 400, 401, 358/488
See application file for complete search history.

(56) References Cited

U.S. PATENT DOCUMENTS

| | | | | |
|---|---|---|---|---|
| 5,383,754 | A * | 1/1995 | Sumida et al. | 412/11 |
| 6,215,977 | B1 * | 4/2001 | Otani | 399/407 |
| 6,567,628 | B1 * | 5/2003 | Guillemin et al. | 399/82 |
| 7,706,014 | B2 * | 4/2010 | Narusawa et al. | 358/1.18 |
| 8,160,365 | B2 * | 4/2012 | Campbell et al. | 382/190 |

OTHER PUBLICATIONS

Paul Roberts Conlon; U.S. Appl. No. 13/155,756, filed Jun. 8, 2011; Frame-Based Coordinate Space Transformations of Graphical Image Data in an Image Processing System.
Paul Roberts Conlon; U.S. Appl. No. 13/155,723, filed Jun. 8, 2011; Image Operations Using Frame-Based Coordinate Space Transformations of Image Data in a Digital Imaging System.
Paul Roberts Conlon; U.S. Appl. No. 13/417,101, filed Mar. 9, 2012; Systems and Methods for Employing Declarative Programming to Optimize Dynamic Operations in Complex Image Forming and Media Handling Devices.
Paul Roberts Conlon; U.S. Appl. No. 13/417,136, filed Mar. 9, 2012; Systems and Methods for Presenting Orientation Flow Graphs in Three Dimensions in Complex Document Handling and Image Forming Devices.

* cited by examiner

*Primary Examiner* — Thomas D Lee

(74) *Attorney, Agent, or Firm* — Ronald E. Prass, Jr.; Prass LLP

(57) ABSTRACT

A system and method are provided to implement dynamic user intent-based finisher options in image forming and document handling systems. The common framework is provided to implement the by which all of the individual component finishing devices are able to be mapped to a particular user's desires such that an output from the complex image forming system meets the user's requirements. Operations of a particular complex image forming system are defined logically. Mappings to the individual devices according to a common reference framework are then overlaid and manipulated according to the common framework. In this manner, a user defines his or her intent in an effort to direct finishing of the document in the manner the user intends rather than according to a default understanding of the finisher.

16 Claims, 4 Drawing Sheets

SYSTEMS AND METHODS FOR IMPLEMENTING DYNAMIC USER INTENT-BASED FINISHER OPTIONS IN IMAGE FORMING AND DOCUMENT HANDLING SYSTEMS

This application is related to U.S. patent application Ser. No. 13/155,756, filed Jun. 8, 2011, entitled "Frame-Based Coordinate Space Transformations Of Graphical Image Data In An Image Processing System," Ser. No. 13/155,723, filed Jun. 8, 2011, entitled "Image Operations Using Frame-Based Coordinate Space Transformations Of Image Data In A Digital Imaging System," Ser. No. 13/417,101, filed Mar. 9, 2012, entitled "Systems And Methods For Employing Declarative Programming To Optimize Dynamic Operations In Complex Image Forming And Media Handling Devices," and Ser. No. 13/417,136, filed Mar. 9, 2012, entitled "Systems And Methods For Presenting Orientation Flow Graphs In Three Dimensions In Complex Document Handling And Image Forming Devices." These applications are co-owned by the Assignee of this application. The disclosures of the related applications are hereby incorporated by reference herein in their entirety.

BACKGROUND

1. Field of Disclosed Subject Matter

This disclosure relates to systems and methods for implementing dynamic user intent-based finisher options in image forming and document handling systems.

2. Related Art

Complex image forming systems combine image forming processes and associated media handling and finishing processes. In the field of image forming devices, very complex production-type systems for advanced image forming, and the associated media handling, have been, and continue to be, developed and deployed. These complex image forming systems may include, for example, multiple stages of image processors with a plurality of feeder devices and a number of finishing devices. Image receiving media flow through these complex image forming (and media handling) systems via multiple paths in an intricate and variable manner according to a particular image forming operation requested by a user and carried out by the complex image forming and finishing systems.

An ordering of the multiple devices in these complex image forming systems can be changed. Individual devices are reordered or replaced in a particular complex image forming system for myriad reasons. As a result, imaging and image receiving media flow paths through the complex image forming systems can be changed and can often become confused. In many instances, a result of this confusion is that image forming errors and/or finishing errors occur. Images can be printed upside down, on a wrong side of the paper, or not in a pre-printed form as a user intended. When a pre-printed form is loaded incorrectly, the overlaying image is oriented incorrectly. This can be corrected in a number of ways. The loading of the pre-printed form could be changed to a certain orientation in three dimensions. Otherwise, the complex document handling and image forming system may be made to comprehend the orientation "error" and, for example, rotate the image independently to match the orientation of the pre-printed form. One modifies the orientation of the image receiving medium, while the other modifies image orientation. Finishing errors may include staples being placed in the wrong corner or folds being improperly applied. Image shifts can be performed in a manner that is wholly detached from an anticipated orientation of the image receiving medium resulting in an improper image shift. These errors, individually or collectively, produce outputs from the complex document handling and image forming systems that are not the finished product that the user expects, leading to customer dissatisfaction.

What is not clear to the common user of the complex image forming system, but is common knowledge to those of skill in the art, is that any particular imaging task or job requested by a user includes multiple individual imaging and media handling operations, each according to a specified orientation. An exemplary and non-exhaustive list of individual imaging operations includes scaling or sizing, translation or image shift, mirroring or reflecting, and rotation of images in two dimensions and of image receiving media in three dimensions. Each individual image processing and/or media handling component that is included as a portion of a particular complex imaging forming system may carry out individual tasks with a particular flow of the images and the image receiving media through that individual component that cannot be changed.

Difficulties often arise in that an order of individual image forming operations is non-commutative. As such, certain manipulation of the order of the operations, including adding additional steps, could be undertaken to produce a repeatable output based on an ordering of the operations. This manipulation can make the outcome of the operations repeatable. Stated differently, any change in the order of these operations as a set of transformations will typically result in a different output unless modified in some manner that may or may not be available to the system designer and/or programmer.

The above difficulties can be compounded based on conventional approaches to programming of the individual devices and specifically characterizing orientations of images and image receiving media within that programming. The characterizations of orientations of images and image receiving media in the programming of conventional systems are generally viewed, and therefore provided, in a descriptive or narrative form. When programs are written in, for example, C code or C++, rather than characterizing the image orientations according to any common and manipulable mathematical framework, descriptive terms (or enumerations) are employed. These may include, for example, descriptors such as "faceup" or "facedown," and "inboard" or "outboard." With regard to raster orientations, similar descriptive terms are used such as, for example, "slow scan" and "fast scan." In finishing devices, these descriptive terms may include specification, for example, of stapling being directed to an "upper left" corner of a document. These descriptive terms may be generally understood and tracked in the context of a single simple image forming device. Interpretation of these descriptive terms, however, across different devices that make up a complex image forming system tends to be inconsistent and therefore haphazard.

Individual component devices with the complex image forming system operate according to their own default coordinate spaces in two dimensions for imaging and in three dimensions with regard to image receiving medium orientations. The system designer and/or programmer must piece together individual component devices s of the complex image forming system initially according to a complex iterative trial and error process in order to provide a complex image forming system in which a user obtains an output from his or her requested imaging job according to the user's desires. For example, if a sheet of image receiving media goes through a complex system, and at the output of the complex system, the image is upside down, or otherwise not in the desired or expected orientation, the system designer and/or programmer may add a rotation to account for this discrepancy. There will be instances, however, where the addition of such steps in not possible.

Once this complex iterative trial and error method is completed for a particular complex system, the system designer and/or programmer is not finished. The schemes that result from the trial and error process remain very fragile. Even slight changes in operations can cripple the correctness of the solution. When a particular component in the complex image forming system is replaced, the process must be repeated, often again in a trial and error manner, in order to obtain a repeatable outcome that is according to the user's desires. In other words, any slight change in configuration for the system generally renders all of a previous trial and error effort to determine a correct scheme a nullity. The system programmer must, in many cases, essentially start over from scratch.

Specifically in finishers, a user may wish to specify that stapling occurs in, for example, the upper left corner. Complex image forming systems may, however, include multiple finishers. Specification of the upper left corner may result in different, and often wrong, finishing based on the orientation of the image receiving medium as it flows through the complex image forming system and is presented to the finisher. In other words, the finisher is stupid. The finisher will always recognize upper left corner with respect to its own internal and device-specific default frame of reference. If the sheet of image receiving medium is rotated as it travels through the complex image forming system and arrives at the finisher rotated 90°, 180°, or 270°, from the orientation that the finisher expects, the finisher generally will not recognize any of these differing orientations. The outcome of this failure in recognition is that the finishing operation, i.e., the stapling in this example, will be undertaken by the finisher according to the "upper left corner" as the finisher recognizes that position, which will not be as the user intended.

Finishers often operate according to specific fixed enumerations. For example, enumeration 1 may specify upper left corner. Other individual enumerations 2-4 may then specify other positions on the image receiving medium as the position that the finisher is going to act upon in carrying out its operation. These enumerations cannot be rotated according to conventional schemes as appropriate when the sheet of image receiving medium is rotated out of its desired or expected orientation according to the finisher. A user may select which of the enumerations the user desires, e.g., a position at which the user wants the document to be stapled. If the image receiving medium arrives at the finisher orthogonally rotated in some orientation different from the default orientation used by the finisher, user's intended selection is not carried out because the finisher operates on the image receiving medium in the orientation that it is presented to the finisher according to the specified enumeration. This places a tremendous burden on the software/developer that controls the system. Inflexibility leads to inflexible, finisher-specific code being developed to handle various scenarios. This "solution" becomes unmanageable and error prone quickly.

Absent smart algorithms in complex image forming systems with multiple feeders and finishers, functions that are undertaken, for example, by finishers will rely on default settings that will produce results that are not in accordance with the user's desires, or as the user "intends." In other words, processing within device will remain device centric, rather than user centric.

SUMMARY OF THE DISCLOSED EMBODIMENTS

In view of the above-identified shortfalls in conventional complex image forming and systems, previous research by the inventor of the subject matter of this disclosure has defined a common framework for transformation of image origins and coordinate spaces across multiple devices. See, e.g., co-owned U.S. patent application Ser. No. 13/155,756, entitled "Frame-Based Coordinate Space Transformations Of Graphical Image Data In An Image Processing System" and Ser. No. 13/155,723, entitled "Image Operations Using Frame-Based Coordinate Space Transformations Of Image Data In A Digital Imaging System."

In a three-dimensional system, there is a set of forty-eight definable coordinate systems. (Note that in this context, imaging typically occurs in a two-dimensional coordinate system. In the two-dimensional system, there is a set of eight definable coordinate systems that may simply be considered a subset of the set of forty-eight definable three-dimensional coordinate systems in which Z is consistently set to zero). One of the forty-eight variations represents the standard Cartesian coordinate system, and the other forty-seven variations are deviations from that standard. For ease of interpretation, and to avoid confusion, this disclosure will refer to the available set of coordinate systems as "the forty-eight coordinate systems." This set of forty-eight coordinate systems is based on the existence of six sets of XYZ orientations that can be mapped to each of the eight corners of a cube representing the three-dimensional system. These forty-eight coordinate systems can be alternatively mathematically represented according to a corresponding set of forty-eight individual mathematical representations transformations that respectively identify each of the coordinate systems.

Examples of limited numbers of the above-described mathematical representations and associated visual representations are presented in the above-identified co-owned U.S. patent applications. FIGS. 1A and 1B illustrate an example correspondence between a visual representation of a three-dimensional coordinate system 100 and a corresponding mathematical representation 150 according to this inventor's previous work as a foundation for the disclosed systems and methods. As shown in FIG. 1A, each of the forty-eight coordinate systems may be visually represented as having an origin 110 from which orthogonal axes, X-axis 120, Y-axis 130 and Z-axis 140 emanate. The origin 110 could be anyone of the eight corners of the depicted cube. Varying combinations of the axes will emanate from each of those origins resulting in the forty-eight coordinate systems discussed above. A mathematical representation 150, in a mathematical matrix format as shown in FIG. 1B, may be assigned to each of the coordinate systems. This assignment of mathematical representations, in a mathematical matrix format, as shown, facilitates combining program operations (transformations) using matrix algebra as a processing medium for the systems and methods according to this disclosure. It should be noted that the specific mathematical representations shown in in FIG. 1B, and in the referenced documents, are only examples of the mathematical representation matrices that could be employed to define each of the forty-eight coordinate systems. Those of skill in the art of image forming systems and mathematics will recognize that a particular three-dimensional coordinate system can be represented in a number of different ways mathematically in the form of a numerical matrix.

Regardless of their construct, the corresponding set of forty-eight individual mathematical representations, when taken together, define a mathematical group under the operations of rotations and reflection. With the forty-eight coordinate systems being defined or represented mathematically, matrix algebra is applied in manipulation of the individual mathematical transformations to rotate or reflect the coordinate spaces to different ones of the forty-eight possible orientations. Each resultant orientation is a member of the mathematical group. Any series of multiple operations undertaken to a beginning orientation necessarily results in an ending orientation that is defined as one of the orientations in the group.

An advantage of finding a common definition or interpretation for the multiple coordinate systems as they are applied to image forming and media handling devices is that individual orientations of images and image receiving media in the image forming and media handling devices can be expressed and manipulated according to the common mathematical framework. Coordination can then be effected between the image receiving media flowing through a complex system of multiple devices and images being processed by the system according to raster images and visual images. Application of the mathematical framework provides a capability by which the effects of changes that are made in an order of imaging operations can be accurately predicted and evaluated, obviating the requirement for conventional complex trial and error processes in order to achieve or maintain the desired output from the system. The derived mathematical framework facilitates a level of automation and precision that was previously unavailable to system designers and/or programmers.

Systems and methods described in U.S. patent application Ser. Nos. 13/417,101 and 13/417,136 provide schemes by which to track changes of orientation for images in two dimensions and image receiving media in three dimensions in order that, for example, the user may be told how to properly pre-flight the image forming system (load the image receiving media in the input tray) to achieve the desired outcome. There will be situations, however, where the loading of the image receiving medium in the input tray is fixed, particularly where the complex image forming systems may include multiple flow paths through which the complex systems act on image receiving media input from a common source. Given these constraints, it may be necessary to modify the operation of one or more finishers in order that the output is as the user intends. An example may be where the image receiving medium passes through much of the complex image forming system in a long edge feed (LEF) orientation. At some point in the image flow path through the complex image forming device, a component device may change the orientation of the image receiving medium to short edge feed (SEF) for a particular reason. Because this changes the orientation that may be presented to the finisher, the finisher must be told to operate on the image receiving medium in the manner that it is presented to the finisher which may be different from the default operation of the finisher.

It would be advantageous in view of the above-identified shortfalls in the prior art to expand this inventor's concept, as described in the above-referenced documents, to cover finishing by finishing devices that are fixed in their operations. An advantage in implementing a user intent-based methodology is to provide a common framework by which all of the individual component finishing devices are able to be mapped to a particular user's desires such that an output from the complex image forming system meets the user's requirements.

Exemplary embodiments of the systems and methods according to this disclosure may define operations of a particular complex image forming system logically and then overlay mappings to the individual devices according to a common reference framework.

Exemplary embodiments may provide a common reference framework by which the user can define his or her intent in an effort to direct finishing of the document in the manner the user intends rather than according to a default understanding of the finisher, or the way the particular finisher is attached to the overall system. For example, in instances, the same finishing device may be attached on the "left" or on the "right," but rotated 180°. In such a circumstance, the finisher may need to rotate the finishing position 180°. This is just one example of how finishing can play in the overall system. In another example, the paper may be loaded Short Edge Feed (SEF) rather than according to a default Long Edge Feed (LEF) for the finisher in what may be considered "situational rotation." The overall system may correct the relationship of the image to the image receiving medium by rotating images 90° to comport with the orientation of the image receiving medium. The challenge of the orientation at the finisher remains.

Exemplary embodiments may provide a common reference framework to which individual enumerations of operations in finishing devices can be mapped. In this manner, individual enumerations, which are fixed with respect to a particular finishing device, are converted into a logical space in a manner that allows for application of logical rotations thereby facilitating an output from the finisher being as the user intended.

Exemplary embodiments may take a specific enumeration, such as "Staple Upper Left," (which may represent enumeration 1 for the finisher) and an extract the specific enumeration out as an index. Individual indices may then be treated as points upon which the finisher is intended to act. These indices may be represented as coordinates, for example, (1, 1), (2, 1) and so on. Applying these individual indices may result in a grid being logically formed to reference individual positions on the image receiving medium. The grid may present an abstract manner by which to specify each of the individual enumerations. The indices are then treated as points in a coordinate space.

Exemplary embodiments may provide a common mathematical framework by which to specify a position on the image receiving medium at which the finisher is directed to carry out its operation. In other words, the indices may be used to "lie to" the finisher and to apply a cross-enumeration mapping scheme that results in the finisher acting on the image receiving medium in the manner the user intended.

Exemplary embodiments may provide an ability for finishers with fixed enumerations to operate according to the common reference framework.

Exemplary embodiments may provide a method by which an orientation of the image receiving medium with respect to the finishing device is specified so as to allow the finishing device to provide the correct enumeration with regard to the orientation of the image receiving medium such that the finishing operation is carried out in the manner the user intended.

Exemplary embodiments may modify enumerations in order to make orientations of the operations undertaken by the finishing devices comport with an unchangeable orientation of an image receiving medium presented to the finishing device.

Exemplary embodiments may provide a logical manner by which a matrix applied to an operational finisher may facilitate "lying" the device by providing a common framework by which to describe individual enumerations in a manner that is consistent with the above-referenced mathematical representations of operations and orientations through the flow paths of the complex image forming system.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for implementing dynamic user intent-based finisher options in image forming and document handling systems will be described, in detail, with reference to the following drawings, in which.

DETAILED DESCRIPTION OF THE DISCLOSED EMBODIMENTS

Figures 1A, 1B:
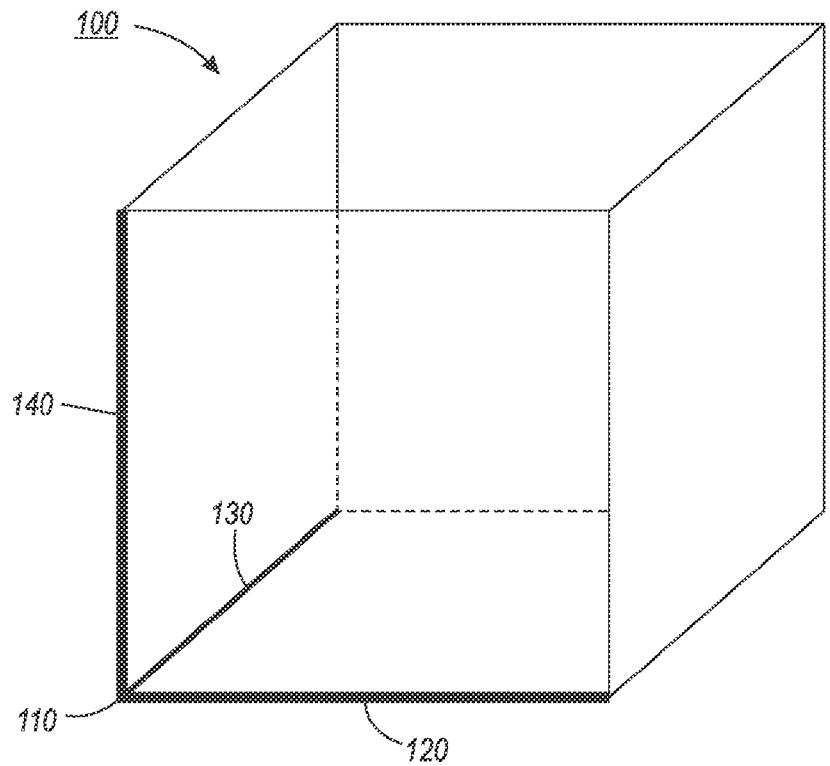
FIGS. 1A and 1B illustrate an example correspondence between a visual representation of a three-dimensional coordinate system and a corresponding mathematical representation according to this inventor's previous work as a foundation for the disclosed systems and methods.

The systems and methods for implementing dynamic user intent-based finisher options in image forming and document handling systems according to this disclosure will generally refer to this specific utility or function for those systems and methods. Exemplary embodiments described and depicted in this disclosure should not be interpreted as being specifically limited to any particular configuration, any particular set of mathematical representations associated with a set of coordinate spaces, or any particular programming language, or as being specifically directed to any particular intended use. Any methodology for controlling complex operations in which components are subjected to a flow of the individual components through a complex manufacturing system including multiple devices each including its own flow path for the individual components through a particular device that may orient the components in three dimensions is contemplated as being included in this disclosure.

Specific reference to, for example, an image forming device throughout this disclosure should not be considered as being limited to any particular type of image forming device including, for example, any of a printer, a copier or a multi-function device. The terms "image forming device" and "complex image forming system," as referenced throughout this disclosure are intended to refer globally to any component, device, system, or system of systems that include various capabilities for electronic image processing and/or image receiving media handling. These various capabilities generally include receiving an image from an image source and an image receiving medium from an image receiving medium source, registering the image on the image receiving medium, and finishing the image forming process by mechanically manipulating the image receiving medium with some manner of finisher. The finisher may comprise, for example, a stapling device, a hole punching device, a folding device, a binding device, or other like output finishing device that would be familiar to those of skill in the art.

The systems and methods according to this disclosure will be described as being particularly adaptable to use in complex image forming systems including a plurality of feeder and finisher devices. Complex image forming systems may include multiple feeders, multiple marking engines, and multiple finishers, but the systems and methods according to this disclosure should not be considered as being limited to any particular level of complexity or any particular combination of image processing and/or media handling component devices.

The term "intent-based" generally refers to making a particular image forming device complying to a user's specific desires without the need/burden to consider the underlying device specifics. Consider for example, the user holding a sheet of image receiving medium and indicating that processing of image be undertaken with respect to a specific origin as the user holds the sheet of image receiving medium. "Intent" should be broadly interpreted to refer generally to an outcome that meets the user's expectations, e.g., as the user intended, or as the user holds the sheet of image receiving medium.

Intent-based implementations with regard to finishers mean basically as the user intended. The user "expects" an operation to be executed with regard to the document in an orientation that the user holds the document, and not as the user intended the document to come out of a particular device. In finishing, the user may want the upper left corner of the document stapled as the user holds the document, and not the upper left corner as the document may be presented to the finisher. According to the disclosed scheme, finishing uses a logical "index space" to specify relevant finishing locations.

Specifically with regard to finishers, a user wants to specify finishing options in an intent-based manner. An ability to configure finishing devices with different orientations, or to accept job tickets originally printed on another device with a different configuration, by correctly mapping finishing enumerations based on the finisher's default orientation is problematic. Certain programming attempts to describe finishing options in an intent-based manner, but these conventional models are broken.

Finishing choices are described as enumerations (vs. coordinates in a device or image vector spaces for imaging). In their native form, these enumerations are not amenable to the application of the above-described coordinate system transformation techniques.

Take an example where, in its path through the complex image forming system, a sheet of image receiving medium is rotated 180° because the image needs be rotated. The finishing device must then be told to modify its operation, such as, for example, stapling in an upper left corner, to meet the user's intent. Otherwise, the device will staple the output image receiving medium in the upper left corner, but this staple will not be in accordance with the user's intent because the image receiving medium is rotated 180°. In other words, the staple will end up in the lower right corner of the document, not in accordance with the user's intent. Physically the finishing device has a fixed concept of where upper left is. Because the image is logically rotated 180°, however, that fixed concept of what upper left is with regard to the rotated image receiving medium needs to be modified in the finishing device. In this example, the device must be told to staple the document in the lower right corner in order to be in compliance with the user's intent. Put another way, the user's intent is that the device staple the document in the upper left corner. Because, however, the system was required (unchangingly) to rotate the image receiving medium 180° in order to properly record the image thereon, there must be some logical manner by which to change the enumeration of the finishing device in this instance from upper left to lower right in order to be correct with regard to the user's intent.

Conventionally, the problem may be addressed by device-specific code for a particular finisher configuration, not dynamically managed by a system in the manner proposed. The "declarative" programming schemes discussed in related U.S. patent application Ser. No. 13/417,101 may aid in determining feasible image rotations/reflections and paper rotations in three dimensions for images as well as for finishers as part of an overall system. In this regard, it should be understood that enumerations are "stupid." Once they are converted into a mathematical form, it becomes possible to write code that searches for the set of feasible conditions to apply to finishing as well. Using the systems and methods according to this disclosure, a system developer may enumerate and test feasibility of a mapping from intent-based user requests to actual finisher options. If a requested intent-based finisher option is found to be not feasible for a particular finisher, a programming scheme may look, for example, to other finishers in a catalog, or explore image rotations or image forming medium rotations, expanding a likelihood that the requested finishing option can be met.

Device-specific operations must be transformed to user intent-based solutions. This is accomplished by essentially lying to the device regarding what orientation the image receiving medium is in as it enters the device. This can only be accomplished, however, by establishing a common framework by which to logically explain to the device how its operations must necessarily change. Such a logic scheme does not exist in the prior art.

The disclosed method allows finishing to seamlessly integrate into algorithms that handle orientation and graphics operations. Enumerations are mapped to an index space, and with special adjustments, rotation and reflection operations can be performed on the enumeration index within an index space. The process is then inversed, and the correct enumeration is generated.

When specifying a finishing value (enumeration), such as staple upper left corner, from a user's view, no specific coordinate on an image receiving medium sheet is specified. The finishing options have a spatial layout, albeit imprecisely defined and specifically referenced to a default coordinate space for the finishing device. The disclosed embodiments create an index space for the sheet of image receiving medium and assign finishing enumerations to a location in that index space.

Figure 2:
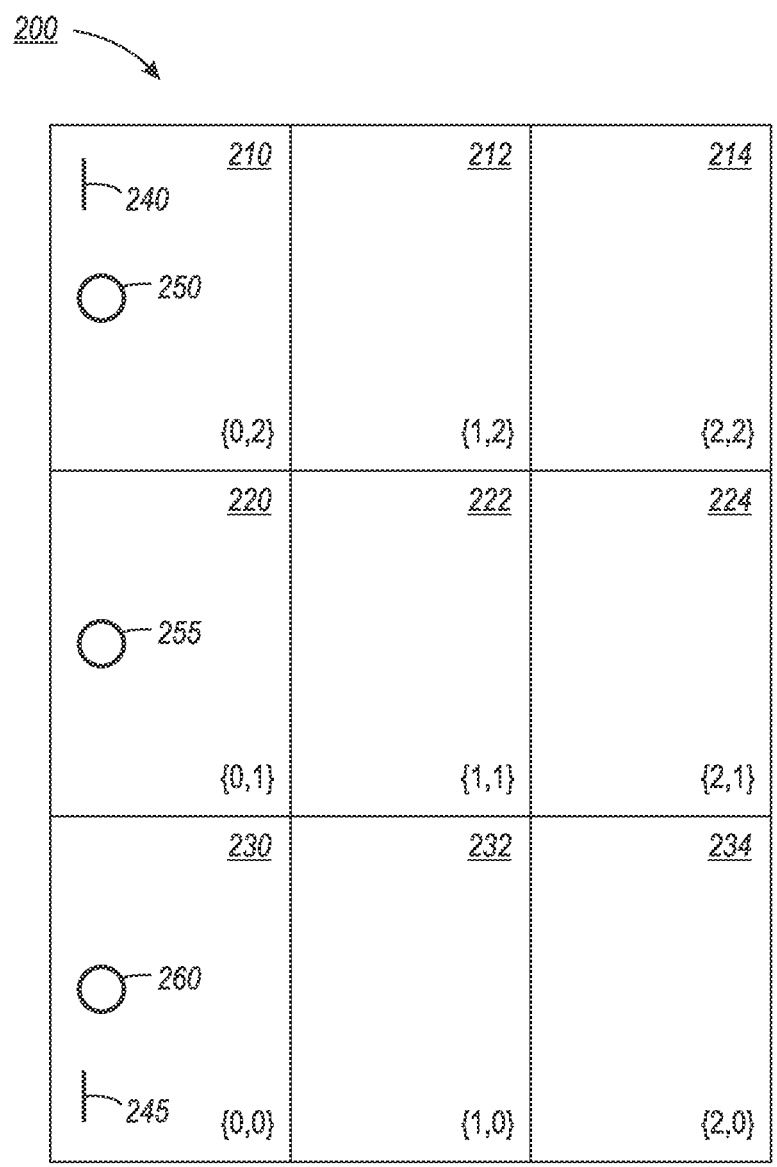
FIG. 2 illustrates an exemplary grid of points with integer coordinates as indexes that can be associated with device enumerations in order to be manipulated according to the disclosed systems and methods.

FIG. 2 illustrates an exemplary grid of points with integer coordinates as indexes that can be associated with device enumerations in order to be manipulated according to the disclosed systems and methods. The example shown in FIG. 2 is limited to two dimensions for simplicity and ease of depiction, but general algorithms for index rotation and reflection in three dimensions 3D have been developed to accommodate for, for example, a "staple down" request when the generically finisher staples up. This approach allows finishing to "play" in a formal dynamic framework for handling image receiving medium sheet and image orientations.

FIG. 2 illustrates a grid of points 200. The points 210-236 have integer coordinates, e.g., {0,0}, {0,1}, . . . {2,2} as shown. As indexes, these points can be associated with finishing values (enumerations) that can be manipulated via affine operations in two dimensions or three dimensions using ordinary rotation and reflection matrices such as those described in the above-referenced prior work by this inventor. A centering technique may be applied prior to operations, and a de-centering technique may be applied after operations are completed, the operations being composited due to affine nature.

By way of a visual example, FIG. 2 actually includes two separate finishing scenarios and their indices in index space. These two separate finishing scenarios are "dual stapling left" (see elements 240, 245 in top and bottom cells), and three-hole punch (see elements 250-260 in top, middle/center, and bottom cells). Logical specifying of finishing locations is undertaken. Because finishing often involves multiple locations, sets of finishing indexes may be defined. As a result, imaging operations, e.g., rotations/reflections in two or three dimensions, may be applied to the entire set of indices at once. Analogous to using a centering technique on a graphical object prior to rotation, here the "object" operated on is the particular grid. The center is the geometric centroid of the set of indices, e.g., {1,1} for the example shown in FIG. 2. It should be recognized that these methods apply equally well to non-square rectangular grids.

As an example of how the method operates, consider a user intent-based finishing selection of a single staple in the top right corner of the document. If the sheet of image receiving media was rotated by 270° CCW, the method needs to determine which stapler would now need to be used to maintain the user intent-based finishing top right staple selection based on the sheet of image receiving media having been rotated.

An algorithm converts the enumeration to a mathematical representation, translates the point into a centered index space, applies an inverse of the mathematical representation for the 270° CCW rotation, then de-centers the point in the index space using common computer graphics techniques to produce a mathematical representation of a finishing index which is then converted back to an enumeration for the finishing device. In this example, the finishing device enumeration corresponding to the user intent-based finishing top right selection, based on the 270° CCW rotation is RightBottom (or BottomRight as an alternative naming). A function may be further applied to capture the mapping so that the mapping is adjustable to any size or shape logical index space.

In the manner described above, the disclosed systems and methods present a novel use of index spaces and mappings to preserve user intent-based selections for finishing in image forming and media handling devices. This specific solution allows definitions of finisher enumerations to be integrated seamlessly into this inventor's previously-developed mathematical framework for robust orientation manipulation and control. The method provides "clean" definition of logical finishing layout for individual positions and sets of positions.

Figure 3:
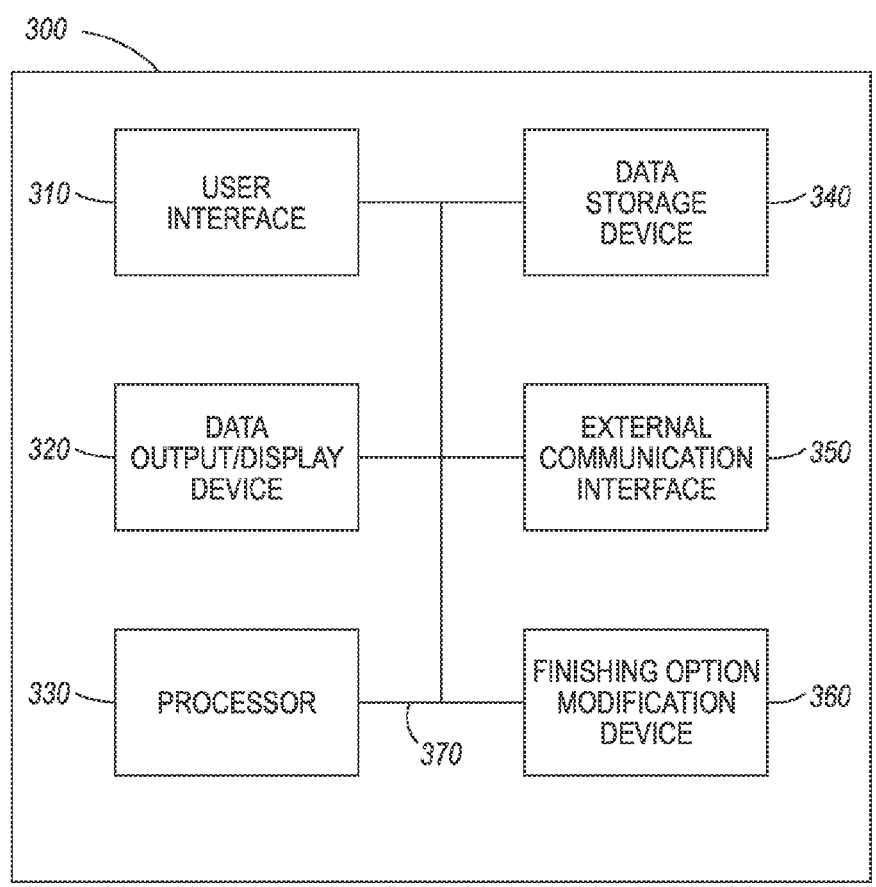
FIG. 3 illustrates a block diagram of an exemplary system for implementing dynamic user intent-based finisher options in image forming and document handling systems according to this disclosure.

FIG. 3 illustrates a block diagram of an exemplary system 300 for implementing dynamic user intent-based finisher options in image forming and document handling systems according to this disclosure. The exemplary system 300 may be associated with one or more complex image forming systems as either a standalone device or as a device integrated with the one or more complex image forming systems to modify operations of one or more finishers in the one or more complex image forming systems according to a user's intent-based requirements.

The exemplary system 300 may include a user interface 310 by which a user may communicate with the exemplary system 300. The user interface 310 may be configured as one or more conventional mechanisms common to computing devices such as, for example, a user's workstation, that permit the user to input information to the exemplary system 300. The user interface 310 may include, for example, a conventional keyboard and mouse, a touchscreen with "soft" buttons or with various components for use with a compatible stylus, a microphone by which a user may provide oral commands to the exemplary system 300 to be "translated" by a voice recognition program, or other like device by which a user may communicate specific operating instructions to the exemplary system 300. Alternatively, the user interface 310 may be coupled with the data output/display device 320 as part of a graphical user interface (GUI) associated with the one or more complex image forming systems.

The user interface 310 may be employed by the user to provide instructions to the exemplary system 300 to direct operations of the system 300. The user interface 310 may be employed by the user to input user intent-based finishing options to the one or more complex image forming systems.

The exemplary system 300 may include a data output/display device 320 that may display information regarding user input provided via the user interface 310, as well as information regarding the functioning of the exemplary system 300. The data output/display device 320 may be, for example, employed to provide a graphical display of the user intent-based finishing option selected by the user via the user interface 310. The data output/display device 320 may comprise any conventional means by which to display relevant data regarding the functioning of the exemplary system 300, and may provide the user, in conjunction with the user interface 310, a means to interactively communicate with, and control, the functions undertaken by the exemplary system 300.

The exemplary system 300 may include one or more local processors 330 for individually operating the exemplary system 300 and carrying out the portions of the dynamic modification of operations of one or more finishers in the one or more complex image forming systems with which the exemplary system 300 is associated. Processor(s) 330 may include at least one conventional processor or microprocessor including, for example, a Graphical Processing Unit (GPU) or Central Processing Unit (CPU), that may be provided to interpret and execute instructions in cooperation with other system components for implementing dynamic user intent-based finisher options according to this disclosure in the one or more complex image forming systems. Processor(s) 330 may interpret inputs regarding user-requested finishing options received via a user interface 310. Processor(s) 330 may receive inputs regarding operations of one or more finishing devices in the one or more complex image forming systems by, for example, recovering data regarding the operations from information stored in one or more data storage devices 340 or by communicating directly with the one or more finishing devices the one or more external communication interfaces 350. Processor(s) 330 may track orientations of image receiving media as the image receiving media passes through each of multiple flow paths in the one or more complex image forming systems. It should be noted that these orientations can be tracked in two dimensions and/or three dimensions according to the previously-developed work of the inventor of the subject matter of this application, as discussed in detail in the above-discussed references by this same inventor. Mathematical representations of the operations and orientations provide a common frame of reference for tracking these orientations.

Processor(s) 330, on their own, or in conjunction with a specific finishing option modification device 360, may execute an algorithm that takes as inputs (1) an orientation of a sheet of image receiving media as it arrives at a particularly-selected finishing device in the one or more complex image forming systems, (2) a user's intent-based finishing option for operations in the particularly-selected finishing device, and (3) device-centric finishing options available in the particularly-selected finishing device. The algorithm may be applied to select from among the device-centric finishing options available in the particularly-selected finishing device in order to apply the user's intent-based finishing option to the sheet of image receiving media regardless of the orientation by which the sheet of image receiving media arrives at the particularly-selected finishing device.

The exemplary system 300 may include one or more data storage devices 340 to store relevant data, and/or such operating programs as may be used by the exemplary system 300, and specifically the processor(s) 330 to carry into effect the specified dynamic user intent-based finishing options in the one or more complex image forming systems with which the exemplary system 300 is associated. At least one data storage device 340 may be designated to act as a specific repository for storing a database that may be pre-loaded with information regarding available and the default finishing options for each of the finishing devices associated with the one or more complex image forming systems with which the exemplary system 300 is associated.

Data storage device(s) 340 may include a random access memory (RAM) or another type of dynamic storage device that is capable of storing collected information, and separately of storing instructions for execution of system operations by, for example, processor(s) 330. Data storage device(s) 340 may also include a read-only memory (ROM), which may include a conventional ROM device or another type of static storage device that stores static information and instructions for processor(s) 330.

The exemplary system 300 may include one or more external data communication interfaces 350. The external data communication interface(s) 350 may be provided to facilitate communication with one or more finishing devices in the one or more complex image forming systems in order to obtain from the one or more finishing devices information appropriate to the implementation of the dynamic user intent-based finishing options in the one or more complex image forming systems, or provide to the particularly-selected finishing device instructions regarding which of the available finishing options the particularly-selected finishing device is to execute based on the user's intent-based selection of a finishing option and the orientation of the image receiving medium as it arrives at the particularly-selected finishing device. The external data communication interface(s) 350 may be provided to facilitate wired or wireless communication between the exemplary system 300 and the one or more finishing devices.

The exemplary system 300 may include finishing option modification device 360 that may operate in conjunction with the processor(s) 330 and/or the one or more storage devices 340 to undertake implementation of the user intent-based finishing options in the particularly-selected finishing device according to the above discussion.

All of the various components of the exemplary system 300, as depicted in FIG. 3, may be connected by one or more data/control busses 370. These data/control busses 370 may provide wired or wireless communication between the various components of the exemplary system 300 regardless of whether those components are housed within, for example, a single computing device, or individual ones of the components are housed independently, and also whether the exemplary system 300 is located within one or more complex image forming systems with which exemplary system 300 is associated.

It should be appreciated that, although depicted in FIG. 3 as what appears to be an integral unit, the various disclosed elements of the exemplary system 300 may be arranged in any combination of sub-systems as individual components or combinations of components, integral to a single unit, or as separate components housed in one or more user workstations, associated with one or more image forming devices, or may be otherwise remotely located. Therefore, no specific configuration for the exemplary system 300 is to be implied by the depiction in FIG. 3.

Figure 4:
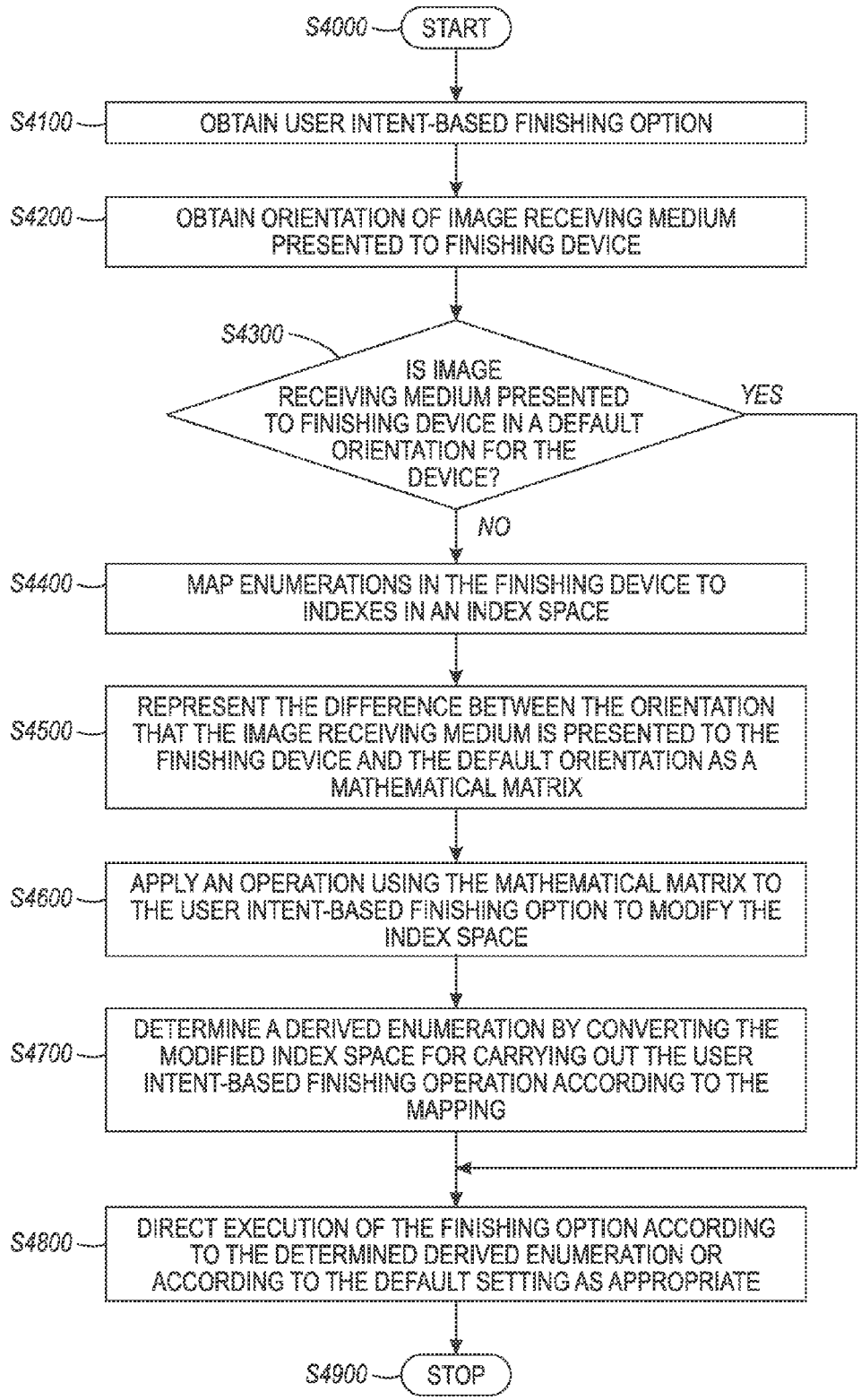
FIG. 4 illustrates a flowchart of an exemplary method for implementing dynamic user intent-based finisher options in image forming and document handling systems according to this disclosure.

The disclosed embodiments include a method for implementing dynamic user intent-based finisher options in image forming and document handling systems. FIG. 4 illustrates a flowchart of such an exemplary method. As shown in FIG. 4, operation of the method commences at Step S4000 and proceeds to Step S4100.

In Step S4100, a user intent-based finishing option may be obtained. Such user intent-based finishing option may be obtained by user input via an input interface. Operation of the method proceeds to Step S4200.

In Step S4200, as the complex image forming system tracks and orientation of the image receiving medium through a particular flow path, an orientation of the image receiving medium presented to a particular finishing device may be obtained. The orientation of the image receiving media may be converted to a mathematical representation. Operation of the method proceeds to Step S4300.

Step S4300 is a determination step. In Step S4300 it is determined whether the image receiving medium is presented to the finishing device in a default orientation for the finishing device.

If, in Step S4300, it is determined that the image receiving medium is presented to the finishing device in a default orientation for the finishing device, there is no need to continue with operations according to the disclosed method. In such an instance, operation of the method may proceed to Step S4800 in which the finishing device may execute the requested finishing option according to default settings for the finishing device.

If, in Step S4300, it is determined that the image receiving medium is not presented to the finishing device in a default orientation for the finishing device, operation the method proceeds to Step S4400.

Finishing options may initially be defined individually, with groups then being formed. An advantage of the proposed schemes including matrix multiplication is that operations can be applied to a group as easily as to individual items, because finishing enumerations are turned into points in a logical space. These schemes are similar to clean, simple, correct, and intuitive techniques used in computer graphics. Rather than visual points in a typical visual scenario for computer graphics imaging, however, these are index points in an index space.

In Step S4400, enumerations representing each of the finishing options capable of being supported by the finishing device are mapped as indexes in an index space. This index space may appear as a matrix of coordinates applied to the image receiving medium by which to define each of the enumerations. Operation of the method proceeds to Step S4500.

In Step S4500, a mathematical representation of the difference in orientation between the actual orientation that the image receiving medium is presented to the finishing device and the default orientation may be derived. This mathematical representation may be in the form of a mathematical matrix. Operation of the method proceeds to Step S4600.

In Step S4600, a mathematical operation is applied using the mathematical matrix derived in Step S4500 to modify the index space in a manner that converts a device-centric (default) setting for the finishing device to the user intent-based finishing option. Operation of the method proceeds to Step S4700.

In Step S4700, a derived enumeration is determined by converting the modified index space from Step S4600 back to one of the available enumerations for the finishing device according to the previously-applied mapping. Operation of the method proceeds to Step S4800.

An illustrative example of the carrying out of the Steps S4700 and S4800 described above may include (1) translating an enumeration for the selected operation into a centered index space, (2) applying appropriate rotation, and (3) de-centering the index space using known graphics techniques to (4) determine the required new finishing mapping of an available operation from the image forming device to be applied to the image receiving medium in the rotation that the image receiving medium is presented to the finishing device.

In Step S4800, in instances where Steps S4400-S4800 are not bypassed based on the determination made in Step S4300, execution of the finishing option according to the determined derived enumeration to carry out the user intent-based finishing option may be directed. Operation of the method proceeds to Step S4900, where operation of the method ceases.

The disclosed embodiments may include a non-transitory computer-readable medium storing instructions which, when executed by a processor, may cause the processor to execute all, or at least some, of the steps of the method outlined above.

The above-described exemplary systems and methods reference certain conventional components to provide a brief, general description of suitable processing means by which to carry into effect the disclosed dynamic user intent-based finisher options in image forming and document handling systems for familiarity and ease of understanding. Although not required, elements of the disclosed exemplary embodiments may be provided, at least in part, in a form of hardware circuits, firmware, or software computer-executable instructions to carry out the specific functions described. These may include individual program modules executed by one or more processors. Generally, program modules include routine programs, objects, components, data structures, and the like that perform particular tasks, or implement particular data types, in support of the overall objective of the systems and methods according to this disclosure.

Those skilled in the art will appreciate that other embodiments of the disclosed subject matter may be practiced with many types of computing systems in many different configurations, executing computer programs in various languages. It should be recognized that embodiments according to this disclosure may be practiced, for example, in computing systems executing differing programming languages. Embodiments according to this disclosure may be practiced in network environments, where processing and control tasks may be performed according to instructions input at a graphical user interface or a user's workstation and/or according to predetermined schemes that may be stored in data storage devices and executed by particular processors, which are in communication with one or more image forming and media handling devices, or complex image forming systems.

As indicated above, embodiments within the scope of this disclosure may also include computer-readable media having stored computer-executable instructions or data structures that can be accessed, read and executed by one or more processors. Such computer-readable media can be any available media that can be accessed by a processor, general purpose or special purpose computer, including graphical processing units and computer processing units, as discussed briefly above. By way of example, and not limitation, such computer-readable media can comprise RAM, ROM, EEPROM, CD-ROM, flash drives, data memory cards or other analog or digital data storage device that can be used to carry or store desired program elements or steps in the form of accessible computer-executable instructions or data structures. When information is transferred or provided over a network or via another communications connection, whether wired, wireless, or in some combination of the two, the receiving processor properly views the connection as a computer-readable medium. Combinations of the above should also be included within the scope of the computer-readable media for the purposes of this disclosure.

Computer-executable instructions include, for example, non-transitory instructions and data that can be executed and accessed respectively to cause a processor to perform certain of the above-specified functions, individually or in various combinations. Computer-executable instructions may also include program modules that are remotely stored for access and execution by a processor.

The exemplary depicted sequence of executable instructions or associated data structures represents one example of a corresponding sequence of acts for implementing the functions described in the steps. The exemplary depicted steps may be executed in any reasonable order to effect the objectives of the disclosed embodiments. No particular order to the disclosed steps of the method is necessarily implied by the depiction in FIG. 4, and the accompanying description, except where a particular method step is a necessary precondition to execution of any other method step.

Although the above description may contain specific details, they should not be construed as limiting the claims in any way. Other configurations of the described embodiments of the disclosed systems and methods are part of the scope of this disclosure.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

I claim:

1. A method for modifying operation of a finishing device in an image forming system, comprising:
   obtaining a user intent-based finishing option for a document produced by the image forming system;
   determining, by a processor, an orientation of a sheet of image receiving media presented to a finishing device that executes a finishing option for the document;
   representing a difference between the orientation of the sheet of image receiving media presented to the finishing device and a default orientation for the finishing device mathematically;
   describing default enumerations for available finishing options for the finishing device as mathematical representations;
   applying an operation with the processor that combines the mathematical representation of the difference between the orientation of the sheet of image receiving medium and the default enumerations to select the default enumeration that represents the user intent-based finishing option; and
   directing finishing of the document according to the selected default enumeration.

2. The method of claim 1, the user intent-based finishing option being obtained by user input via an input interface.

3. The method of claim 1, the orientation of the sheet of image receiving media presented to the finishing device being determined based on tracking the orientation of the sheet of image receiving media as the sheet of image receiving media acted upon in three dimensions as the sheet of image receiving media progresses along an imaging flow path in the image forming system.

4. The method of claim 1, the difference between the orientation of the sheet of image receiving media presented to the finishing device and a default orientation for the finishing device being represented in a mathematical matrix format.

5. The method of claim 1, the default enumerations for the finishing device being mapped to an index space.

6. The method of claim 5, the applying of the operation by the processor comprising manipulating the index space.

7. The method of claim 6, the index space being manipulated according to matrix multiplication principles.

8. The method of claim 6, the manipulating of the index space comprising:
   translating the user intent-based finishing option into a centered index space;
   applying a rotation that represents an inverse of the difference between the orientation of the sheet of image receiving media presented to the finishing device and the default orientation for the image receiving media; and
   de-centering the point in the index space to select the default enumeration that represents the user intent-based finishing option.

9. A system for modifying operation of a finishing device in an image forming system, comprising:
   an input interface via which as user inputs a user intent-based finishing option for a document produced by the image forming system;
   a processor that is programmed to:
      determine an orientation of a sheet of image receiving media presented to a finishing device that executes a finishing option for the document;
      represent a difference between the orientation of the sheet of image receiving media presented to the finishing device and a default orientation for the finishing device mathematically;
      describe default enumerations for available finishing options for the finishing device as mathematical representations;
      apply an operation that combines the mathematical representation of the difference between the orientation of the sheet of image receiving medium and the default enumerations to select the default enumeration that represents the input user intent-based finishing option; and
   an external communication interface by which the system provides instructions to the finishing device to finish the document according to the selected default enumeration.

10. The system of claim 9, the processor being further programmed to track the orientation of the sheet of image receiving media as the sheet of image receiving media is acted upon in three dimensions as the sheet of image receiving media progresses along an imaging flow path in the image forming system.

11. The system of claim 9, the processor being further programmed to represent the difference between the orientation of the sheet of image receiving media presented to the finishing device and a default orientation in a mathematical matrix format.

12. The system of claim 9, the processor being further programmed to map the default enumerations for the finishing device to an index space.

13. The system of claim 12, the processor being further programmed to apply the operation by mathematically manipulating the index space.

14. The system of claim 13, the processor mathematically manipulating the index space being according to matrix multiplication principles.

15. The system of claim 13, the manipulating of the index space comprising:
   translating the user intent-based finishing option into a centered index space;
   applying a rotation that represents an inverse of the difference between the orientation of the sheet of image receiving media presented to the finishing device and the default orientation for the image receiving media; and
   de-centering the point in the index space to select the default enumeration that represents the user intent-based finishing option.

16. A non-transitory computer-readable medium storing instructions which, when executed by a processor, cause the processor to execute the steps of a method comprising:
   obtaining a user intent-based finishing option for a document produced by the image forming system;
   determining an orientation of a sheet of image receiving media presented to a finishing device that executes a finishing option for the document;
   representing a difference between the orientation of the sheet of image receiving media presented to the finishing device and a default orientation for the finishing device mathematically;
   describing default enumerations for available finishing options for the finishing device as mathematical representations;
   applying an operation that combines the mathematical representation of the difference between the orientation of the sheet of image receiving medium and the default enumerations to select the default enumeration that represents the user intent-based finishing option; and
   directing finishing of the document according to the selected default enumeration.

* * * * *